June 30, 1942.  E. E. MOYER ET AL  2,288,295
ELECTRIC VALVE CONTROL CIRCUIT
Filed Oct. 31, 1940
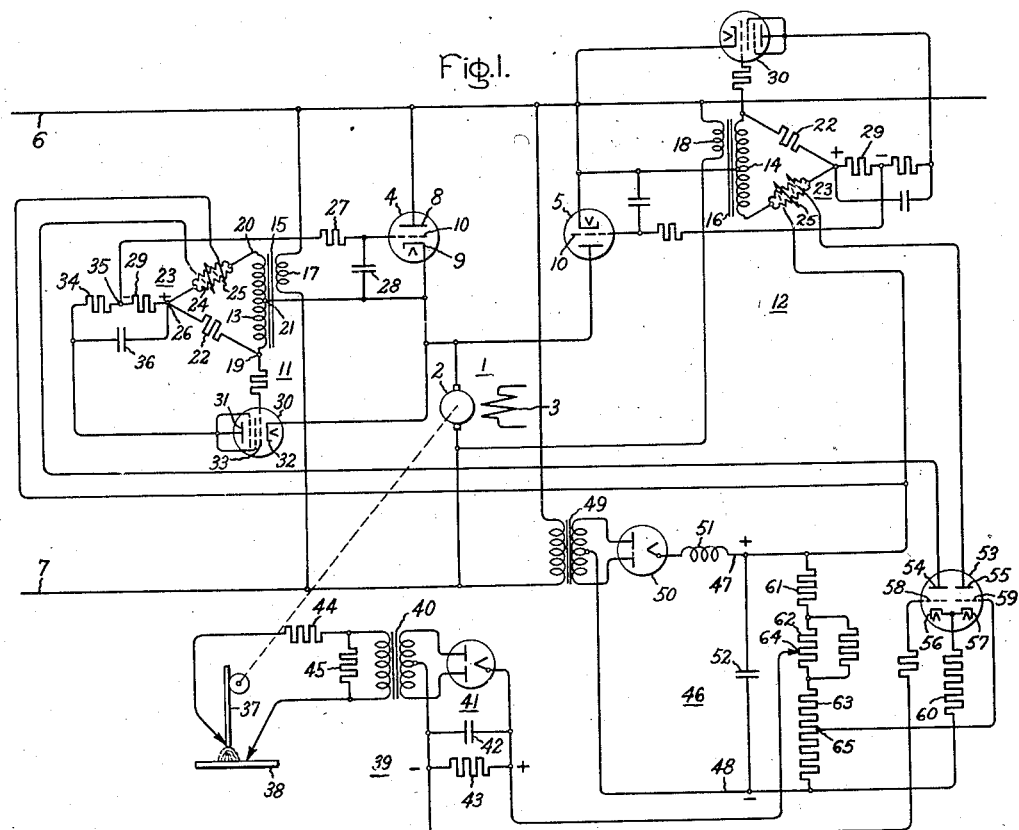
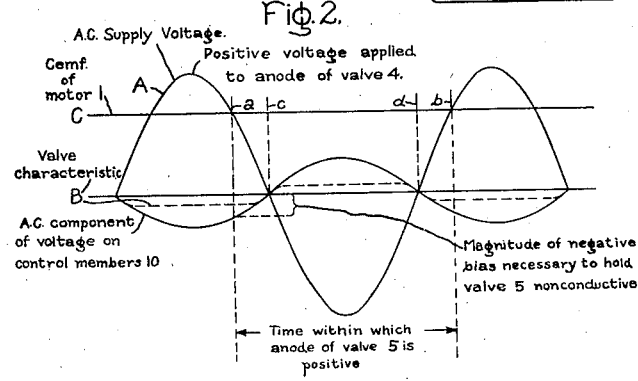
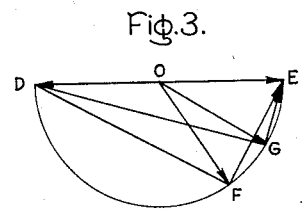
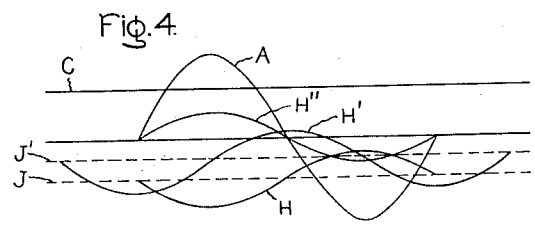
Inventors:
Elmo E. Moyer,
Charles V. Bullen,
by Harry E. Dunham
Their Attorney.

Patented June 30, 1942

2,288,295

UNITED STATES PATENT OFFICE 2,288,295

ELECTRIC VALVE CONTROL CIRCUIT

Elmo E. Moyer, Scotia, N. Y., and Charles V. Bullen, Lubbock, Tex., assignors to General Electric Company, a corporation of New York Application October 31, 1940, Serial No. 363,714

14 Claims. (Cl. 172—239)

Our invention relates to electric valve circuits and more particularly to electric valve circuits for controlling dynamo-electric machines.

It is frequently desirable in the control of dynamo-electric machines to employ electric valve apparatus because of the precision of operation which electric apparatus of this nature affords. In accordance with the teachings of our invention, we provide improvements whereby dynamo-electric machines may be controlled by means of electric valve apparatus in a manner more precise and positive than that afforded by the prior art arrangements.

It is an object of our invention to provide a new and improved electric circuit for controlling electric valve apparatus.

It is another object of our invention to provide a new and improved control system for dynamo-electric machines.

It is a further object of our invention to provide a new and improved electric valve translating apparatus and associated equipment for controlling the speed and direction of rotation of dynamo-electric machines of the direct current type.

Briefly stated, in the illustrated embodiment of our invention we provide an electric valve translating system for controlling the speed and direction of rotation of a direct current motor by means of a pair of reversely connected electric valves of the controlled type, each having a control member for determining the current conducted thereby. An improved control system for determining the conductivity of the electric valve means is provided whereby the valves are rendered selectively conducting and non-conducting in a precise manner by impressing on the control members of the electric valves variable phase periodic or alternating control voltages and superimposing on the periodic or alternating voltages unidirectional biasing potentials the magnitudes of which vary as the phase of the alternating voltages vary, thereby cooperating with the periodic or alternating voltages to effect more positive control of the conductivities of the electric valves.

For a better understanding of our invention, reference may be had to the following description taken in connection with the accompanying drawing, and its scope will be pointed out in the appended claims. Fig. 1 diagrammatically illustrates an embodiment of our invention as applied to a system for controlling the speed and direction of rotation of a direct current motor which is energized from an alternating current supply circuit, and Figs. 2–4, inclusive, represent certain operating characteristics thereof.

Referring now more particularly to Fig. 1, our invention is illustrated as applied to controlling the speed and direction of rotation of a dynamo-electric machine of the direct current type, such as a direct current motor 1, having an armature winding 2 and a field winding 3. We provide electric translating apparatus including a pair of reversely connected or oppositely connected electric valves 4 and 5 for transmitting variable amounts of unidirectional current of determinable polarity to one of the windings, such as the armature winding 2 of motor 1, to control the speed and the direction of rotation of the motor 1. The translating apparatus is energized from a suitable source of alternating current comprising conductors 6 and 7. The electric valves 4 and 5 are preferably of the type employing an ionizable medium such as a gas or a vapor and each includes an anode 8, a cathode 9 and a control member 10 which controls the conductivity or the amount of current conducted thereby.

In systems of the above described nature where a pair of reversely connected electric valves are employed to determine the speed and direction of rotation of the motor, it has been found that under some conditions of operation one of the valves which at a particular time is intended to be maintained nonconducting, will conduct current due to the fact that the counter E. M. F. of the motor acting in conjunction with the voltage derived from the alternating current circuit is such as to cause that valve to become conducting even though it is desired to maintain the valve nonconducting. This erratic operation is caused in part by the fact that as the voltage between the anode and cathode increases substantially, it becomes necessary to impress on the control members of the valves voltages of a more negative character in order to maintain the valve nonconducting. That is, as the anode-cathode voltage increases, it becomes necessary to increase the magnitude of the instantaneous negative biasing potential to maintain the electric valve in a nonconducting condition. In accordance with the teachings of our invention described hereinafter, we provide circuits for controlling the conductivities of the electric valves 4 and 5 so that the valves are precisely rendered conducting and nonconducting.

We provide a pair of excitation circuits 11 and 12 for impressing variable control potentials on control members 10 of electric valves 4 and 5 to control the amount of current and the polarity of the current supplied to the motor 1. The excitation circuits 11 and 12 comprise windings 13 and 14, respectively, which furnish alternating voltages. Windings 13 and 14 may be provided by employing transformers 15 and 16 having primary windings 17 and 18, respectively. The primary windings 17 and 18 may be connected to the alternating current circuit including conductors 6 and 7. Each of the windings 13 and 14 is provided with a pair of terminal connections 19 and 20 and a connection 21 electrically intermediate the terminal connections. In order to impress on each of the associated control members 10 a periodic or alternating potential of variable phase displacement with respect to the voltage of the alternating current supply circuit or with respect to the anode-cathode voltage of the associated electric valve, we provide a static impedance type phase shifting circuit including a pair of impedance elements such as a resistance 22 and a variable impedance element, which may be a saturable inductive reactance or reactor 23, comprising variable impedance windings 24 and a control winding 25. The common juncture 26 of the impedance elements is connected to the control member 10 of the associated electric valve. A current limiting resistance 27 may be connected in series relation with the associated control member 10 and a suitable filtering capacitance 28 may be connected between the anode 8 and the cathode 9 of the associated electric valve.

As a means for producing a unidirectional biasing potential the magnitude of which varies simultaneously with the variations in phase of the alternating current component of voltage produced by excitation circuit 11, we provide means energized in accordance with variable phase voltages derived from the phase shifting circuit. It is, of course, understood that each of the excitation circuits 11 and 12 comprises means of this character for automatically varying the magnitude of the biasing potential in response to the shift in phase of the alternating component of voltage. We provide in each excitation circuit a suitable impedance element such as a resistance 29 and an electric discharge device 30 which are connected in series relation between the common juncture 26 and the cathode 9 of the associated electric valve. The electric discharge device 30 may be either of the high vacuum type or of the type employing an ionizable medium and including an anode 31, a cathode 32 and a control grid 33. The discharge device 30 may also comprise other or additional control members if desired. An additional resistance 34 may be connected in series relation with resistance 29 and the anode-cathode circuit of electric discharge device 30 and the common juncture 35 of these two resistances may be connected to the control member 10 of the associated electric valve through resistance 27. Resistance 34 and resistance 29 together serve as a voltage divider to impress a predetermined amount of the maximum available component of the unidirectional voltage on the control member 10 of electric valve 4. A capacitance 36, if desired, may be connected across resistances 29 and 34 to absorb extraneous voltage variations in this part of the circuit and to serve as a filter so that the voltage appearing across resistance 29 is substantially free of alternating components.

Control windings 25 of the saturable reactors 23 in excitation circuits 11 and 12 are variably energized to control the resultant potential impressed on the control members 10 of electric valve means 4 and 5. In illustrating our invention, we have chosen to show the control windings 25 as being variably energized in response to a predetermined controlling influence, such as the voltage, appearing across the arc in an arc welding system including an electrode 37 the position of which relative to the work 38 is controlled by means of an actuating mechanism driven by the armature 2 of motor 1. The motor 1 controls the position of the electrode 37 relative to the work 38 in response to the magnitude of the arc voltage. The control system for variably energizing the windings 25 in excitation circuits 11 and 12 is of the type disclosed and claimed in United States Letters Patent No. 2,175,017, granted October 3, 1939 upon an application of William D. Cockrell and which is assigned to the assignee of the present application.

In order to obtain a unidirectional voltage the magnitude of which varies in response to the voltage of the arc, we employ a circuit 39 including a transformer 40, a full wave rectifier 41, a capacitance 42 connected in parallel in the output circuit of the rectifier 41 and a resistance 43 which is connected across the capacitance 42. A current limiting resistance 44 may be connected in series relation with the primary winding of the transformer 40, and a resistance 45 may be connected in parallel relation therewith.

To energize variably the control windings 25 in excitation circuits 11 and 12 and in turn to control the conductivities of electric valves 4 and 5, thereby controlling the position of the electrode 37, we employ a voltage sensitive circuit 46 of the type disclosed and claimed in the above-identified patent. The voltage sensitive circuit 46 includes a source of direct current comprising conductors 47 and 48 which are energized from any suitable source, such as a transformer 49, which is energized from the alternating current circuit including conductors 6 and 7, and also includes a suitable full wave rectifier 50. A smoothing reactance 51 may be connected in series relation with the rectifier 50, and a capacitance 52 may be connected across the conductors 47 and 48 to maintain the voltage impressed across these conductors at a substantially constant value.

An electric valve means 53, preferably of the high vacuum type, is also included in the voltage sensitive circuit 46 and comprises a pair of electric discharge paths including anodes 54 and 55, cathodes 56 and 57 and control grids 58 and 59. Cathodes 56 and 57 are connected together and the anodes 54 and 55 are connected to the control windings 25 of the saturable reactors in excitation circuits 11 and 12, respectively. The electric discharge paths of the electric valve means 53 transmit variable amounts of unidirectional current to the control windings 25. A resistance 60 is connected to the cathodes 56 and 57 and in series relation with both of the electric discharge paths of electric valve means 53 and serves to control the potential of the cathodes in accordance with the sum of the currents conducted by the discharge paths. A voltage divider including serially connected resistances 61, 62 and 63 is connected across the direct current source including conductors 47 and 48. The resistance 62 is provided with an adjustable tap or connection 64, and the resistance 63 is provided with a tap 65 which is connected to grid 59. The potential impressed on grid 59 is one of substantially constant value, whereas the potential of grid 58 varies in accordance with the magnitude of the output voltage of rectifier 41 and consequently varies in accordance with the arc voltage.

The operation of the embodiment of our invention shown in Fig. 1 of the drawing will be explained by considering the system when the motor 1 is operating to maintain the arc voltage substantially constant by maintaining the electrode 37 at a substantially constant distance from the work 36. It will thus be appreciated that the motor 1 will be required to move the electrode 37 toward the work or away from the work, at variable speeds, in order to effect this result. Furthermore, it will be necessary, in order to effect this operation, to supply variable amounts of unidirectional current to the armature 2 of motor 1, and the polarity of this current must be reversed in order to reverse the direction of rotation of motor 1. When electric valve 4 is conducting, the current supplied to the armature 2 of motor 1 will be of one polarity and, hence, the motor will rotate in one direction if the field excitation provided by field winding 3 is fixed in direction. Conversely, if the electric valve 5 conducts current, the polarity of the current supplied to the armature 2 of motor 1 will be reversed and the motor will rotate in the opposite direction. As concerns the amount of current conducted by electric valves 4 and 5, it will be appreciated that where the electric valves 4 and 5 are of the type employing an ionizable medium, the magnitude of the average current conducted thereby depends upon the period of conductivity of the valve with respect to the anode-cathode voltage applied thereto. As the phase of the resultant voltage impressed on the control members 10 is advanced from a lagging position toward a position of phase coincidence with the anode-cathode voltage, the average current conducted by the electric valves is increased, and as the phase of the control member voltage is retarded the average current is decreased. Of course, the magnitude of the average current conducted by the electric valves is determined by the phase position of the resultant voltage.

Where the electric valves 4 and 5 are of the type comprising a grid interposed between the anode and cathode, in many of the commercial embodiments it is necessary to impress a negative potential on the control member in order to maintain the electric valves nonconducting. The instantaneous value of the biasing potential which must be impressed upon the control member to maintain the electric valves nonconducting for various instantaneous values of applied anode-cathode voltage has been commonly referred to as the grid control characteristic of the electric valve. This characteristic is represented by curve B in Fig. 2 where the curve A represents the anode-cathode voltage applied to a valve and the curve B represents the magnitude of the biasing or hold-off voltage which must be applied to maintain the electric valve nonconducting or to bias the electric valve to cut-off as it is sometimes described.

With the prior art arrangements for controlling the direction of rotation of the motor by means of a pair of reversely connected electric valves, the valve which at a particular time was supposed to be in a nonconducting condition frequently began to conduct current because the anode voltage of the nonconducting tube is the resultant or sum of the instantaneous alternating voltage of the supply circuit and the counter E. M. F. of the motor which may be represented in Fig. 2 by line C, and inasmuch as this resultant voltage becomes positive with respect to the anode of the off tube at a time prior to the occurrence of the negative portion of the grid voltage derived from the alternating current supply circuit. These conditions may be more fully explained by referring to the operating characteristics shown in Fig. 2. At the time corresponding to point $a$, the alternating component of the voltage applied to the control member 10 of the off tube is positive. If it be assumed that the system dictates that electric valve 4 is to be conducting and the electric valve 5 is to be nonconducting and if the magnitude of the counter E. M. F. of motor 1 corresponds to line C, then the anode-cathode voltage applied to the electric valve 5 is positive during each cycle of voltage of the supply circuit corresponding to the interval $a$—$b$. However, it will be noted that electric valve 5 is to be maintained nonconducting but the alternating component of voltage impressed on the control member 10 thereof during the intervals $a$—$c$ and $d$—$b$ is positive relative to the associated cathode, tending to render electric valve 5 conducting. Consequently, it is necessary to impress on the control member 10 a biasing potential to maintain electric valve 5 nonconducting during these intervals.

In the prior art arrangements where an alternating component of voltage of variable phase displacement has been impressed on the control member of an electric valve in combination with a unidirectional biasing potential, the effective range of phase control or conductivity of the electric valve means is substantially reduced by virtue of the negative biasing potential, particularly when it is required to control the electric valve from the "full-on" position to the "full-off" position. The reason for this reduction of the effective range of phase control will be apparent when it is considered that the variable phase control voltage must be shifted through a substantial angle in order to overcome effectively the biasing potential and then must be shifted through an additional range to increase the conductivity of the valve. By using apparatus built in accordance with our invention where the magnitude of the biasing potential automatically varies with the phase of the alternating component of voltage, the effective range of control produced by the alternating component of voltage is maintained substantially coincident with the actual range of phase shift of the alternating component of voltage and is not reduced by the negative biasing potential.

Considering more particularly the operation of the excitation circuits 11 and 12, these circuits are arranged to produce negative unidirectional biasing potentials across resistances 29 which automatically vary in accordance with the phase of the alternating component of voltage produced by the static impedance type phase shifting circuit including windings 13 and 14 and resistances 22 and reactors 23. By utilizing voltages derived from the static impedance phase shifting circuit having relatively variable phase relationships, the conductivities of the electric discharge devices 30 are varied to produce unidirectional biasing potentials, which may be negative, across the terminals of resistances 29. Furthermore, the excitation circuits 11 and 12 are arranged so that the inductive reactance of reactors 23 is minimum when the magnitude of the negative unidirectional biasing potential is minimum, and the inductive reactances of reactors 23 are maximum when the unidirectional biasing potentials are maximum. Stated in other words, the negative unidirectional biasing potentials have a maximum value when the phase displacement between the alternating component of voltage and the voltage of the alternating voltage supply circuit is a maximum, and have a minimum value when the phase displacement is a minimum.

The operation of the excitation circuits 11 and 12 may be more fully explained by referring to the operating characteristics shown in Fig. 3. Considering excitation circuit 11 in particular, the voltage appearing across the terminals of winding 13 may be represented by vector DE, and the potential of the intermediate connection 21 may be represented by the point O. As the magnetization of the reactor 23 is increased towards the saturation point, the inductive reactance of windings 24, of course, decreases. The points F and G represent two conditions of magnetization of the reactor 23, and the vectors FE and GE represent the voltage drop across the windings 24 for these conditions of magnetization. The vectors DF and DG represent the voltage drop across the resistance 22 for these same conditions. Vectors OF and OG represent the alternating component of voltage impressed on control member 10 of electric valve 4 from the excitation circuit. As the saturation of reactor 23 is increased, the control member voltage represented by vectors OF and OG swing through lagging quadrants to positions more nearly in phase with the anode-cathode voltage, that is, more nearly in phase with vector DE.

The negative unidirectional biasing potential produced by electric discharge device 30 and resistance 29 varies in magnitude by virtue of the variable phase relationship between the anode-cathode voltage applied to discharge device 30 and the grid voltage applied to control grid 33 from the static impedance phase shifting circuit. The anode-cathode voltage applied to the electric discharge device 30 may be represented by vectors OF and OG and the grid voltage applied to grid 33 may be represented by vector OD. It will thus be seen that as the magnetization of the reactor 23 is varied the phase relation between the anode-cathode voltage and the grid voltage of device 30 also varies, thereby controlling the average value of current conducted thereby and controlling the magnitude of the negative unidirectional biasing potential produced across resistance 29. As the magnetization of reactor 23 is increased towards the saturation point, thereby effecting a reduction in the inductive reactance thereof, the phase displacement between the anode-cathode voltage and grid voltage of device 30 is increased in the sense that the grid voltage lags the anode voltage effecting a reduction in the magnitude of the average current transmitted through resistance 29 and thereby reducing the magnitude of the biasing potential. Conversely, as the magnetization of the reactor 23 is decreased, the anode-cathode and grid voltages of device 30 swing more nearly in phase effecting an increase in the current transmitted thereby and effecting an increase in the negative biasing potential.

Fig. 4 may be referred to in connection with the operation of the excitation circuits 11 and 12 and the electric valves 4 and 5. The curves of Fig. 4 represent the relationship between the alternating component of control member voltage and the negative unidirectional biasing potential for different degrees of conductivity dictated by the associated system. Curve H represents the phase of the alternating component of control member voltage when it is desired to maintain one of the electric valves, such as electric valve 4, nonconducting. Line J represents the magnitude of the negative unidirectional biasing potential for this condition of operation. Curve H' represents the alternating component of control member voltage for an increased degree of conductivity of the electric valve 4, and curve J' represents the corresponding biasing potential, and curve H'' represents the alternating component of control member voltage when the electric valve 4 is completely conducting or "full-on." In this last case, it will be noted that the biasing potential is zero or substantially zero. By inspection of the curves in Fig. 4, it will be seen that the biasing potential is substantially increased as the alternating component of voltage is retarded to the "full-off" position and is decreased in value as the alternating component of voltage is advanced in phase, thereby effecting an increase in the effective range of control of the alternating component of voltage.

For the purpose of explaining the operation of the system as a whole, let it be assumed that the electric valve 4 when conducting tends to raise the electrode 37 and that electric valve 5 when conducting tends to lower the electrode 37. If the arc voltage increases above the predetermined value, indicating that the electrode 37 is too far removed from the work 38, the potential of grid 58 decreases, effecting a reduction in the magnitude of the current transmitted to control winding 25 of reactor 23 in excitation circuit 11 and effecting an increase in the current transmitted to control winding 25 in excitation circuit 12. This variation in current retards the phase of the control member voltage of electric valve 4 and advances the phase of the control member voltage of electric valve 5, thereby rendering electric valve 4 nonconducting and rendering electric valve 5 conducting. The resultant effect of this change is to move the electrode 37 towards the work 38, thereby restoring the arc voltage to the desired value. When the phase of the voltage impressed on control member 10 of electric valve 4 is retarded, the magnitude of the biasing potential impressed on control member 10 is increased automatically in the manner explained above to assure that the electric valve 4 is maintained nonconducting, and when the phase of the alternating component of voltage impressed on control member 10 of electric valve 5 is advanced, the biasing potential for this control member is decreased automatically. It will be understood that the system also operates in response to a decrease in the arc voltage to move the electrode 37 away from the work to maintain the position of the end of the electrode 37 substantially fixed with respect to the work 38.

As concerns the operation of the electric valve means 53 and the control windings 25 of reactors 23 in excitation circuits 11 and 12, it will be appreciated that the sum of the currents supplied to the control windings 25 remains substantially constant and that the magnitudes of the currents in the respective windings vary inversely; that is, as the current in one winding increases the current in the other control winding decreases, thereby effecting opposite variations in phase of the alternating components of voltage impressed on the control members 10 of electric valves 4 and 5 with respect to the associated anode-cathode voltages or with respect to the voltage of the alternating current supply circuit.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an alternating current circuit, a load circuit, electric translating apparatus connected between said circuits and comprising an electric valve having an anode, a cathode and a control member, means for impressing on said control member an alternating voltage of variable phase displacement relative to the voltage of said alternating current circuit and comprising a static impedance type phase shifting circuit including a variable impedance element, means for controlling said variable impedance element, and means for superimposing on said alternating voltage a variable unidirectional component of voltage comprising a resistance and an electric discharge device for transmitting variable amounts of unidirectional current through said resistance and having an anode-cathode circuit and a grid circuit energized in accordance with variable phase voltages derived from said phase shifting circuit.

2. In combination, an alternating current circuit, a load circuit, electric translating apparatus connected between said circuits and comprising an electric valve having an anode, a cathode and a control member, means for impressing on said control member an alternating voltage of variable phase displacement relative to the voltage of said alternating current circuit and comprising a static impedance type phase shifting circuit including a variable impedance element, means for controlling said impedance element, means for superposing on said alternating voltage a variable unidirectional component of voltage comprising a resistance and an electric discharge device for transmitting variable amounts of unidirectional current through said resistance, said discharge device including an anode-cathode circuit and a grid circuit, and means for controlling the conductivity of said electric discharge device comprising means for energizing the anode-cathode circuit and the grid circuit in accordance with variable phase voltages derived from said phase shifting circuit.

3. In combination, an alternating current circuit, a load circuit, electric translating apparatus connected between said circuits and comprising an electric valve having an anode, a cathode and a control member, means for impressing on said control member a periodic voltage of variable phase displacement with respect to the anode-cathode voltage comprising a winding having terminal connections and a connection electrically intermediate the terminal connections and a pair of impedance elements connected to the terminal connections and having a common juncture, means for controlling one of the impedance elements to control the phase of said periodic voltage, and means for superimposing on said periodic voltage a variable unidirectional potential comprising an electric discharge device having an anode, a cathode and a grid, the anode-cathode circuit of said discharge device being connected between said common juncture and the cathode of said electric valve and the grid being connected to one of said terminal connections.

4. In combination, an alternating current circuit, a load circuit, electric translating apparatus connected between said circuits and comprising an electric valve having an anode, a cathode and a control member, means for impressing on said control member a periodic voltage of variable phase displacement with respect to the anode-cathode voltage of said electric valve and comprising a winding having terminal connections and a connection electrically intermediate said terminal connections and a pair of impedance elements connected to the terminal connections and having a common juncture, means for controlling one of the impedance elements to control the phase of said periodic voltage, and means for superimposing on said periodic voltage a variable unidirectional voltage comprising a resistance and an electric discharge device having an anode, a cathode and a grid, the anode-cathode circuit of said discharge device and said resistance being connected in series relation between said common juncture and the cathode of said electric valve and the grid being connected to one of said terminal connections.

5. In combination, an alternating current circuit, a load circuit, electric translating apparatus connected between said circuits and comprising an electric valve having an anode, a cathode and a control member, means for impressing on said control member an alternating voltage of variable phase displacement with respect to the anode-cathode voltage comprising a winding having terminal connections and a connection electrically intermediate the terminal connections and a pair of impedance elements connected to the terminal connections and having a common juncture, one of said impedance elements constituting a saturable reactance having a control winding, means for variably energizing said control winding to control the phase of said alternating voltage, and means for superimposing on said alternating voltage a variable unidirectional potential comprising an electric discharge device having an anode, a cathode and a grid, the anode-cathode circuit of said discharge device being connected between said common juncture and the cathode of said electric valve and the grid being connected to one of the terminal connections.

6. In combination, an alternating current circuit, a load circuit, electric translating apparatus connected between said circuits and comprising an electric valve having an anode, a cathode and a control member, means for impressing on said control member an alternating voltage of variable phase displacement with respect to the anode-cathode voltage comprising a winding having terminal connections and a connection electrically intermediate the terminal connections and a pair of impedance elements connected to the terminal connections and having a common juncture, one of said impedance elements constituting a saturable reactance having a control winding, means for variably energizing said control winding to control the phase of said alternating voltage, and means for superimposing on said alternating voltage a variable unidirectional potential which is maximum in value when the inductive reactance of said saturable reactance is maximum comprising an electric discharge device having an anode, a cathode and a grid, the anode-cathode circuit of said discharge device being connected to said common juncture and the cathode of said electric valve and the grid being connected to one of said terminal connections.

7. In combination, an alternating current circuit, a load circuit, electric translating apparatus connected between said circuits and comprising an electric valve having an anode, a cathode and a control member, means for impressing on said control member an alternating voltage of variable phase displacement with respect to the anode-cathode voltage comprising a winding having terminal connections and a connection electrically intermediate the terminal connections and a pair of impedance elements connected to the terminal connections and having a common juncture, one of said impedance elements constituting a saturable reactance having a control winding, means for variably energizing said control winding to control the phase of said alternating voltage, and means for superimposing on said alternating voltage a variable unidirectional potential having a maximum value when the inductive reactance of said saturable reactance is maximum and a minimum value when the inductive reactance of said saturable reactance is a minimum and comprising an electric discharge device having anode-cathode circuit connected between said juncture and the cathode of said electric valve and having a grid connected to one of said terminal connections.

8. In combination, an alternating current circuit, a direct current motor having an armature winding and a field winding, electric translating apparatus connected between said alternating current circuit and either said armature winding or said field winding and comprising a pair of reversely connected electric valves each having an anode, a cathode and a control member, means for energizing the control members of said electric valves comprising a pair of excitation circuits each including means for impressing on the associated control member an alternating component of voltage of variable phase relation with respect to the voltage of the alternating current circuit, and means including a rectifier controlled exclusively by the last mentioned means and independently of the anode-cathode circuit of the associated electric valve for superimposing on the alternating component of voltage a variable unidirectional component of voltage having a maximum value when the phase displacement between the voltage of said alternating current circuit and the alternating component is maximum and having a minimum value when the phase displacement is a minimum.

9. In combination, an alternating current circuit, a direct current motor having an armature winding and a field winding, electric translating apparatus connected between said alternating current circuit and either said armature winding or said field winding and comprising a pair of reversely connected electric valves each having an anode, a cathode and a control member, means for variably energizing the control members of said electric valves to render selectively said electric valves substantially conducting or non-conducting comprising a pair of excitation circuits each associated with a different one of said electric valves and each including means for impressing on the associated control member an alternating component of voltage of variable phase displacement and means including a rectifier controlled exclusively by the last mentioned means and independently of the anode-cathode circuit of the associated electric valve for superimposing on the alternating component of voltage a variable unidirectional component having a maximum value when the phase displacement between the alternating component and the voltage of said alternating current circuit is a maximum and having a minimum value when said phase displacement is a minimum.

10. In combination, an alternating current circuit, a direct current motor having an armature winding and a field winding, electric translating apparatus connected between said alternating current circuit and either said armature winding or said field winding for transmitting thereto a resultant unidirectional current of predetermined polarity thereby controlling the direction of rotation of said motor and comprising a pair of reversely connected electric valves each having an anode, a cathode and a control member, means for selectively rendering each of said pair of electric valves conducting and non-conducting comprising a pair of excitation circuits each associated with a different one of said electric valves and each including means for impressing on the associated control member an alternating component of voltage of variable phase displacement with respect to the voltage of said alternating current circuit and each including means including a rectifier controlled exclusively by the last mentioned means and independently of the anode-cathode circuit of the associated electric valve for superimposing on the alternating voltage a variable negative unidirectional component having a maximum value when the phase displacement between the alternating component to voltage and the voltage of said alternating current circuit is a maximum to assure cut-off of the associated electric valve when such condition is dictated by the associated excitation circuit.

11. In combination, an alternating current circuit, a load circuit, electric translating apparatus connected between said circuits and comprising an electric valve having an anode, a cathode and a control member, phase shifting means for impressing on said control member an alternating component of voltage, means for controlling said phase shifting means to control the phase of said alternating component of voltage relative to the voltage of said alternating current circuit, and means including a rectifier controlled exclusively by said phase shifting means and independently of the anode-cathode circuit of said electric valve for superimposing on said alternating component of voltage a unidirectional component of voltage the magnitude of which varies in response to the magnitude of the phase displacement between said alternating component of voltage and said alternating current circuit.

12. In combination, an alternating current circuit, a load circuit, electric translating apparatus connected between said circuits and comprising an electric valve having an anode, a cathode and a control member, a phase shifting circuit for impressing on said control member an alternating voltage comprising a variable impedance element, means for controlling said variable impedance element to vary the phase between said alternating component of voltage and the voltage of said alternating current circuit, and means including a rectifier controlled exclusively by said phase shifting circuit and independently of the anode-cathode circuit of said electric valve for impressing on said control member a unidirectional component of voltage the magnitude of which varies directly in accordance with the magnitude of the phase displacement between said alternating component of voltage and the voltage of said alternating current circuit.

13. In combination, an alternating current circuit, a load circuit, electric translating apparatus connected between said circuits and comprising an electric valve having an anode, a cathode and a control member, an excitation circuit for energizing said control member comprising means for impressing on said control member an alternating component of voltage of variable phase with respect to the voltage of said alternating current circuit, and means including a rectifier controlled exclusively by the phase shifting means and independently of the anode-cathode circuit of said electric valve for impressing on said control member a unidirectional component of voltage which varies simultaneously with the variation in phase of said alternating component of voltage.

14. In combination, an alternating current circuit, a load circuit, electric translating apparatus connected between said circuits and comprising an electric valve having an anode, a cathode and a control member, an excitation circuit for energizing said control member comprising phase shifting means for impressing on said control member an alternating component of voltage of variable phase displacement with respect to the voltage of said alternating current circuit, and means including a rectifier controlled exclusively by said phase shifting means and independently of the anode-cathode circuit of said electric valve for impressing on said control member a unidirectional component of voltage the magnitude of which varies in accordance with the magnitude of the phase displacement between said alternating component of voltage and the voltage of said alternating current circuit.

ELMO E. MOYER.
CHARLES V. BULLEN.